ced. 22, 1964

3,162,590
PROCESS FOR PREPARING POLYFLUORINATED NITROSOALKANES

Joseph D. Park, Boulder, Colo., assignor to Minnesota Mining and Manufacturing Company, St. Paul, Minn., a corporation of Delaware
No Drawing. Filed June 5, 1961, Ser. No. 114,646
8 Claims. (Cl. 204—158)

This invention relates to polyfluorinated nitrosoalkanes and to a process for their production.

It is known that trifluoronitrosomethane can be produced in small yield by reacting a mixture of silver trifluoroacetate with nitrosyl chloride, heating to remove excess nitrosyl chloride, and pyrolysis of the residue (e.g., J. Banus, Journal of the Chemical Society, 1953, pages 3755–3761).

It has now been found that superior yields of trifluoronitrosomethane, of the order of 3 to 4 times those obtained by the above procedure, can be obtained by photolysis of purified nitrosyl trifluoroacetate, according to the process of the invention. It has also been found that higher fluorinated nitrosoalkanes can be obtained by the same procedure.

An object of the invention is to provide a process for the production of trifluoronitrosomethane.

Another object is to provide a process for the production of polyfluorinated nitrosoalkanes.

Still other objects will become evident hereinafter.

Broadly speaking, and in accordance with the above and other objects of the invention, it has been found that nitrosyl polyfluoroacylates are photolyzed to give excellent yields of the corresponding fluorinated nitrosoalkanes.

The nitrosyl fluoroacylates (which may also be designated as polyfluoroacylnitrites) are readily obtained in stable, substantially pure form and can be distilled under reduced pressure at temperatures below about 100° C.

The nitrosyl polyfluoroacylates employed for the process of the invention are represented by the formulae:

$$X(CF_2)_nCOONO$$
$$R_fOCF_2CF_2COONO$$
$$Z-CFCl(CF_2-CFCl)_mCF_2COONO$$
$$Z-(CF_2-CFCl)_mCF_2COONO$$
$$CF_2ClCF_2(CFCl-CF_2)_mCFCl-COONO$$

X is a member of the group consisting of hydrogen, chlorine and fluorine; Z is a perhalomethyl radical having a total atomic weight not greater than 146.5; $R_f$ is a perfluoroalkyl radical having from 1 to 8 carbon atoms; $n$ is an integer from 1 to 12; and $m$ is a number from 0 to 5. These nitrosyl polyfluoroacylates are conveniently prepared by reaction of the acid anhydrides with a nitrosyl halide as described in copending application, Ser. No. 114,645, filed in the names of J. D. Park and R. W. Rosser, or by reaction of certain salts of the acids with nitrosyl halides as described in copending application Ser. No. 114,644, filed in the name of C. W. Taylor. The disclosures of these applications are included herein by reference.

The type formulae $Z(CF_2CFCl)_mCF_2COONO$ and $$Z-CFCl(CF_2-CFCl)_mCF_2COONO$$

are typical of nitrosyl polyfluoroacylates derived from acids formed by the oxidation and hydrolysis of polymers including halogenated telomers of such perhalogenated monomers as chlorotrifluoroethylene and the like.

The term $Q_f$ may be used to designate collectively and inclusively the polyfluorinated radical attached to the nitrosyl acylate and nitroso groups of the compounds comprehended within the scope of the invention. The equation which illustrates the course of the reaction may then be written:

$$Q_fCOONO \xrightarrow{h\nu} Q_fNO + CO_2\uparrow$$

Telomers produced using bromotrichloromethane as a telogen ultimately yield (after oxidation) acids having a terminal trichloromethyl group. Telomers produced using perhalomethanes other than bromotrichloromethane as telogens also yield acids corresponding to the above formulae. The requirement is that the telogen contain a bromine atom and not produce, at the end of the telomer molecule opposite the bromine atoms, an end group which is more easily hydrolyzed than the CFClBr end group which is readily converted to a carboxylic acid end group during oxidation of the telomer. Suitable telogens other than bromotrichloromethane are the perhalogenated methanes; bromotrifluoromethane, bromochlorodifluoromethane, bromodichlorofluoromethane, dibromodifluoromethane, and dibromochlorofluoromethane. All of these latter telogens produce telomers containing a CFClBr group at one end of the molecule and containing at the opposite end a perhalomethyl group, that is, a Z group which is not more susceptible to hydrolysis than the aforesaid CFClBr group. Respectively, the Z groups are $CF_3$, $CClF_2$, $CFCl_2$, $CBrF_2$, $CFBrCl$. For convenience, these perhalomethyl terminal groups may be designated collectively as those having a total atomic weight not higher than 146.5, the atomic weight of the bromochlorofluoromethyl group.

The telomers can be hydrolyzed, as with fuming sulfuric acid, as described in U.S. Patents 2,806,665 and 2,806,666, to yield a variety of polyfluorinated acids. Oxidation of the polymers as described in U.S. Patent 2,863,916 also yields polyfluorinated acids of the type $CF_2ClCF_2(CFCl-CF_2)_mCFCl-COOH$. The nitrosyl polyfluoroacylates from all such polyfluorinated acids are equivalents for the purposes of this invention.

Broadly speaking, the process of the invention is carried out by exposing the selected nitrosyl polyfluoroacylate in the vapor phase or liquid phase to actinic radiation such as ultraviolet light, at a temperature in the range of about 25° C. to 250° C. The higher temperatures, in the range of 90° C. to 250° C., are employed when diluents are present in the reaction mixture as set forth hereinafter.

Whether the liquid phase or gas phase is employed depends upon the reactivity and boiling point of the specific nitrosyl polyfluoroacylate starting material. Highly reactive, easily photolyzed compounds are best treated in the gas phase, or diluted with an inert solvent in liquid phase. Less reactive, high boiling nitrosyl polyfluoroacylates can be photolyzed as liquids if desired.

An inert diluent can usefully be employed because it serves to moderate and control the reaction in such a way that explosions are avoided and smooth, safe, continuous operation of the process for extended periods of time is possible. A diluent gas also provides a carrier for less volatile nitrosyl polyfluoroacylates and permits use of lower temperatures in vapor phase reactions. The use of liquid diluents also provides more mobile (less viscous) reaction mixtures when nitrosyl polyfluoroacylates of higher molecular weight are employed in the liquid phase. Accordingly, the amount of the nitrosyl polyfluoroacylate used is a fraction of the total amount of reactant plus diluent. Thus, about 10 percent or more, by volume of an inert diluent can be used with the nitrosyl polyfluoroacylate. In vapor phase operation, the partial pressure of the reaction in the gas mixture ranges up to about 90 percent of the total pressure. Pressures less than or greater than atmospheric can be used. Preferably, the partial pressure of the reactant is maintained at not more than about 80 percent of the total pressure. Accordingly, at atmospheric pressure, the partial pressure of the nitrosyl polyfluoroacylate is preferably maintained at up to about 600 mm. of mercury. Lower partial pressures can be used. The process becomes somewhat less efficient at very low partial pressures but this effect is overcome by recycling procedures which will be evident to those skilled in the art. Below 5 percent by volume of reactant, the removal of the product from the gas or liquid mixture requires the use of more efficient condensing or stripping systems, for example, scrubbing with fluorinated solvents.

Gaseous diluents which can be employed include such gases as nitrogen, helium and carbon dioxide; these gases are inert for the purposes of the invention. Alternatively, but somewhat less conveniently, the photolysis can be conducted in vacuo, and pressures up to about 600 mm. of mercury can be employed (90 percent of atmospheric). In this way the reduction of pressure without the addition of diluent gas is seen to be the equivalent of dilution. The vapors of inert liquids are also suitable as diluents.

Inert liquids which serve as diluents are such materials as tri(perfluorobutyl)amine, perfluorohexane, perfluoroisooctane, perfluorinated cyclic ethers and the like. The inert liquids and gases employed as diluents must of course be selected from materials which do not absorb the actinic radiation to an extent which will interfere with the photolysis.

Actinic light of wavelengths from about 3500 A. to about 2200 A. is furnished by an ultraviolet source, such as a BH-6 lamp. Such sources are readily available. Other sources of actinic radiation include sunlight, as well as sources of gamma radiation from radioisotopes and the like. Further data on the characteristics of actinic sources and methods of operation are given in the article "Photo-Chemical Engineering" by C. M. Doede and C. A. Walker in Chemical Engineering for February 1955, pages 159 through 178, herein incorporated by reference. While the precise intensity does not appear to be critical it is obviously desirable to provide quanta of energy in an amount sufficient to energize substantially all the molecules of nitrosyl polyfluoroacylate in the vicinity of the actinic source at a rapid rate. Because light of the actinic range is largely absorbed by glass, it is most satisfactory to provide the light source within the reaction vessel which may be of the form of a flask or of a tube for continuous passage of vapors past the light source at a rate commensurate with the energy provided.

Although heating is not necessary, sufficient heat to maintain the reactants and products in the vapor phase is desirable during the reaction, if reaction in the gaseous phase is employed. By passing the mixture of reactant and diluent gases through a tube containing the source of actinic radiation and heated to this temperature, the process can be made continuous. The desired product is readily isolated from the reaction mixture, which contains the co-product carbon dioxide and minor by-products such as carbonyl fluoride, oxides of nitrogen and trifluoronitromethane. Unreacted starting materials can be recycled if desired. The desired product nitrosopolyfluoroalkane is recovered by condensation of the total product, washing with alkali to remove carbon dioxide and other acids and distillation. In cases where the carbon dioxide does not interfere with distillation, the alkali wash may be eliminated.

The process of the invention requires a period of reaction which varies depending upon other conditions such as the temperature, the intensity of the actinic radiation and the concentration of the starting materials. Period of time of the order of minutes suffice to bring about significant decarboxylation when high-intensity UV lamps are used. When less powerful actinic sources are used, the completion of the reaction may require hours. The progress of the reaction is readily followed by visually observing the conversion of the yellowish to substantially colorless nitrosyl starting material to the blue polyfluoronitrosoalkane.

The nitrosopolyfluoroalkanes are useful comonomers with perfluoroolefins for the preparation of elastomers having advantageous properties. For example, the copolymer of trifluoronitrosomethane and tetrafluoroethylene is a rubber with good low-temperature flexibility and solvent resistance. Other nitrosopolyfluoroalkanes provide useful polymers with varying characteristics, all of which are solvent-resistant and oleophobic. Lower molecular weight comonomers produced stretchier rubbers than do those of higher molecular weight, e.g., those with more than about 6 carbon atoms. The resultant polymers are suitable for use in gaskets, etc.

Now, having described the process of the invention in broad terms, it is more specifically illustrated by means of particular examples which serve to show the best mode presently contemplated of practicing the invention without thereby limiting the same. In these examples parts are by weight except where otherwise specified.

EXAMPLE 1

A 7-liter reaction flask having a sump for reception of fluids in the base and enclosing a water-cooled AH-6 ultraviolet lamp is charged with 25 grams of perfluoropropionyl nitrite ($CF_3CF_2COONO$) and the internal pressure is reduced to about 20 mm. Hg pressure to remove oxygen. The lamp is energized so that vapors rising from the liquid nitrosyl perfluoropropionate are decomposed by the ultraviolet light. The sump is warmed with an oil bath for the purpose of volatilizing the starting material. The flask itself, however, remains at about 25° C. The flask gradually fills with blue vapors and the pressure rises during four hours from 20 mm. Hg to 725 mm. Hg. At this time the gas is a brilliant sky-blue. Samples show strong absorption in the infrared at 6.25 microns corresponding to the nitroso group of nitrosopentafluoroethane and at 4.4 microns corresponding to carbon dioxide. The gas is fractionated by scrubbing with water and passage through a tower filled with soda-lime to remove carbon dioxide, and then is condensed in liquid nitrogen-cooled receivers to provide about 85 percent of the theoretical amount of nitrosoperfluoroethane.

EXAMPLE 2

When vapors of nitrosyl perfluorovalerate are drawn through a large tube containing an ultraviolet lamp (suitably using nitrogen as a carrier gas) and then through soda-lime and drying traps and then condensed in a liquid air-cooled receiver, the originally colorless vapor phase turns blue. It is found that the condensate contains nitrosoperfluorobutane, which can be recovered by fractional distillation under reduced pressures preferably keeping the temperature as low as possible.

Other nitrosyl polyfluoroacylates behaves similarly and are photolyzed to form nitroso polyfluoroalkanes either by the above procedure or that of Example 1. Somewhat elevated temperatures, ranging up to about 150° C. are desirably employed when the nitrosyl polyfluoro acylates are of higher molecular weight, as, for example, above about 6 carbon atoms in chain length. The use of reduced pressure in the system or use of greater amounts of carrier gas also assist in carrying out the photolysis by increasing the amount of nitrosyl polyfluoroacylate in the vapor phase. Isolation and recovery of the polyfluoronitrosoalkanes is carried out as set forth above, with due regard for the physical characteristics of individual compounds as is well known to the art.

The following table sets forth the products obtained by photolysis of other nitrosyl polyfluoroacylates. In carrying out the process, the procedure of Example 1 is used, except for increasing the temperature when high-boiling nitrosyl compounds are the starting materials. The boiling points of the starting materials and the products are given. These temperatures are uncorrected.

Table 1

| Nitrosyl Polyfluoroacylate Employed | B.P., °C./ mm. Hg | Polyfluoro Nitrosoalkane Product | B.P., °C./ mm. Hg |
|---|---|---|---|
| $C_2F_5COONO$ | 57.5°/69 | $C_2F_5NO$ | −42°/760. |
| $C_4F_9COONO$ | 51°/10 | $C_4F_9NO$ | 16°/760. |
| $C_5F_{11}COONO$ | 65°/10 | $C_5F_{11}NO$ | 50°/760. |
| $C_8F_{17}COONO$ | 58°/1 | $C_8F_{17}NO$ | 30°/15. |
| $C_9F_{19}COONO$ | 68°/1 | $C_9F_{19}NO$ | 45°/14. |
| $C_{12}F_{25}COONO$ | 86°/0.5 | $C_{12}F_{25}NO$ | 57°/1.5. |
| $CF_3OC_2F_4COONO$ | 55°/20 | $CF_3OC_2F_4NO$ | −10°/760. |
| $C_2F_5OC_2F_4COONO$ | 44°/14 | $C_2F_5OC_2F_4NO$ | 15°/760. |
| $C_3F_7OC_2F_4COONO$ | 63°/10 | $C_3F_7OC_2F_4NO$ | 50°/760. |
| $C_5F_{11}OC_2F_4COONO$ | 53°/1.5 | $C_5F_{11}OC_2F_4NO$ | 48°/100. |
| $C_6F_{13}OC_2F_4COONO$ | 56°/1 | $C_6F_{13}OC_2F_4NO$ | 43°/20. |
| $C_8F_{17}OC_2F_4COONO$ | 73°/1 | $C_8F_{13}OC_2F_4NO$ | 65°/10. |
| $CF_2ClCFClCF_2COONO$ | 53°/1.5 | $CF_2ClCFClCF_2NO$ | 65°/760. |
| $CF_2ClCFClCF_2CFClCF_2COONO$ | 73°/0.5 | $CF_2ClCFClCF_2CFClCF_2NO$ | 51°/10. |
| $CF_2ClCFCl(CF_2CFCl)_2CF_2COONO$ | 103°/0.5 | $CF_2ClCFCl(CF_2CFCl)_2CF_2NO$ | 65°/1. |
| $CF_2ClCFCl(CF_2CFCl)_4CF_2COONO$ | (¹) | $CF_2ClCFCl(CF_2CFCl)_4CF_2NO$ | (¹) |
| $CCl_3CF_2CFClCF_2COONO$ | 75°/0.5 | $CCl_3CF_2CFClCF_2NO$ | 51°/10. |
| $CCl_3(CF_2CFCl)_2CF_2COONO$ | 100°/0.5 | $CCl_3(CF_2CFCl)_2CF_2NO$ | 57°/1. |
| $CCl_3(CF_2CFCl)_3CF_2COONO$ | (¹) | $CCl_3(CF_2CFCl)_3CF_2NO$ | 78°/0.5. |
| $CCl_3(CF_2CFCl)_4CF_2COONO$ | (¹) | $CCl_3(CF_2CFCl)_4CF_2NO$ | (¹) |
| $H(CF_2)_6COONO$ | 57°/1.5 | $H(CF_2)_6NO$ | 90°/760. |
| $H(CF_2)_{10}COONO$ | 69°/10 | $H(CF_2)_4NO$ | 30°/760. |
| $H(CF_2)_{11}COONO$ | 97°/1 | $H(CF_2)_{11}NO$ | 54°/1.5. |
| $Cl(CF_2)_5COONO$ | 70°/10 | $Cl(CF_2)_4NO$ | 60°/760. |
| $Cl(CF_2)_7COONO$ | 55°/1 | $Cl(CF_2)_6NO$ | 55°/80. |
| $ClCF_2COONO$ | 52°/20 | $ClCF_2NO$ | −35°/760. |
| $CF_2ClCF_2CFClCOONO$ | 75°/0.5 | $CF_2ClCF_2CFClNO$ | 50°/10. |

¹ Distils below 100° C. at very low pressures. Shortpath or molecular distillation is useful for purification.

What is claimed is:
1. The process for the production of polyfluoronitrosoalkanes which comprises subjecting a nitrosyl polyfluoroacylate to decarboxylation with actinic radiation.
2. The process for the production of polyfluoronitrosoalkanes which comprises subjecting a nitrosyl polyfluoroacylate to the action of ultraviolet light.
3. The process for the production of a fluorinated nitrosoalkane selected from the group consisting of polyfluorinated nitrosoalkanes of the formulae:

$$X(CF_2)_nNO$$
$$R_fOCF_2CF_2NO$$
$$Z-CFCl(CF_2-CFCl)_mCF_2NO$$
$$Z-(CF_2-CFCl)_mCF_2NO$$
$$CF_2ClCF_2(CFCl-CF_2)_mCFClNO$$

wherein X is a member of the group consisting of hydrogen, chlorine and fluorine; Z is a perhalomethyl radical having a total atomic weight not greater than 146.5; $R_f$ is a perfluoroalkyl radical having from 1 to 8 carbon atoms; $n$ is an integer from 1 to 12; and $m$ is a number from 0 to 5; which comprises the steps of subjecting a compound selected from the group of compounds represented by the formulae:

$$X(CF_2)_nCOONO$$
$$R_fOCF_2CF_2COONO$$
$$Z-CFCl(CF_2-CFCl)_mCF_2COONO$$
$$Z-(CF_2-CFCl)_mCF_2COONO$$
$$CF_2ClCF_2(CFCl-CF_2)_mCFClCOONO$$

wherein X, Z, $R_f$, $n$ and $m$ have the same significance as above, to decarboxylation by actinic radiation.

4. The process for the production of a polyfluorinated nitrosoalkane of the formula:

$$X(CF_2)_nNO$$

wherein X represents a member of the group consisting of hydrogen, chlorine and fluorine and $n$ is an integer from 1 to 12; which comprises the step of subjecting a compound of the formula:

$$X(CF_2)_nCOONO$$

wherein X and $n$ have the same significance as before, to decarboxylation by actinic radiation.

5. A process for the production of a polyfluorinated nitrosoalkane of the formula:

$$R_fOCF_2CF_2NO$$

wherein $R_f$ is a perfluoroalkyl radical having from 1 to 8 carbon atoms; which comprises the step of subjecting a compound of the formula:

$$R_fOCF_2CF_2COONO$$

wherein $R_f$ has the same significance as before, to decarboxylation by actinic radiation.

6. A process for the production of a polyfluorinated nitrosoalkane of the formula:

$$Z-CFCl(CF_2-CFCl)_mCF_2NO$$

wherein Z is a perhalomethyl radical haivng a total atomic weight not greater than 146.5, and $m$ is a number from 0 to 5; which comprises the step of subjecting a compound of the formula:

$$Z-CFCl(CF_2-CFCl)_mCF_2COONO$$

wherein Z and $m$ have the same significance as before, to decarboxylation by actinic radiation.

7. A process for the production of a polyfluorinated nitrosoalkane of the formula:

$$Z-(CF_2-CFCl)_mCF_2NO$$

wherein Z is a perhalomethyl radical having a total atomic weight not greater than 146.5 and $m$ is a number from 0 to 5; which comprises the step of subjecting a compound of the formula:

$$Z-(CF_2-CFCl)_mCF_2COONO$$

wherein Z and $m$ have the same significance as before, to decarboxylation by actinic radiation.

8. A process for the production of a polyfluorinated nitrosoalkane of the formula:

$$CF_2ClCF_2(CFClCF_2)_mCFClNO$$

wherein $m$ is a number from zero to 5, which comprises the step of subjecting a compound of the formula:

$$CF_2ClCF_2(CFClCF_2)_mCFClCOONO$$

wherein $m$ has the same significance as before, to decarboxylation by actinic radiation.

References Cited in the file of this patent

Coe et al.: Journal of American Chemical Society, vol. 70 (1948), pages 1516–19.